(12) United States Patent
Wang

(10) Patent No.: US 10,567,206 B2
(45) Date of Patent: Feb. 18, 2020

(54) SYNCHRONIZATION METHOD, APPARATUS, AND SYSTEM

(71) Applicant: Huawei Technologies Co., Ltd., Shenzhen (CN)

(72) Inventor: Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/545,471

(22) PCT Filed: Jan. 21, 2015

(86) PCT No.: PCT/CN2015/071221
§ 371 (c)(1),
(2) Date: Jul. 21, 2017

(87) PCT Pub. No.: WO2016/115695
PCT Pub. Date: Jul. 28, 2016

(65) Prior Publication Data
US 2018/0013601 A1 Jan. 11, 2018

(51) Int. Cl.
*H04L 12/28* (2006.01)
*H04L 27/26* (2006.01)
*H04W 56/00* (2009.01)
(Continued)

(52) U.S. Cl.
CPC ..... *H04L 27/2656* (2013.01); *H04B 1/70735* (2013.01); *H04L 5/0023* (2013.01);
(Continued)

(58) Field of Classification Search
CPC ....................................... H04J 12/50

USPC .......................................................... 370/329
See application file for complete search history.

(56) References Cited

U.S. PATENT DOCUMENTS 9,986,373 B2 * 5/2018 Davydov ................ H04W 4/02
2014/0050206 A1 2/2014 Seo et al.
(Continued)

FOREIGN PATENT DOCUMENTS

CN      102239649 A    11/2011
CN      102396198 A     3/2012
(Continued)

OTHER PUBLICATIONS

Foreign Communication From a Counterpart Application, PCT Application No. PCT/CN2015/071221, English Translation of International Search Report dated Jul. 29, 2015, 2 pages.
(Continued)

*Primary Examiner* — Dang T Ton
(74) *Attorney, Agent, or Firm* — Conley Rose, P.C.

(57) ABSTRACT

A synchronization method, an apparatus, and a system, which relate to the communications field and applied to synchronization signal transmission to implement synchronization of data frame transmission between devices on an unlicensed carrier are provided. The synchronization method is applied to synchronization on an unlicensed carrier. A network device sets a synchronization signal in a first subframe, and the network device sends the first subframe or the first subframe and a second subframe to user equipment, where the first subframe includes M orthogonal frequency division multiplexing (OFDM) symbols, the second subframe includes N OFDM symbols, M and N are positive integers, M>N, and the first subframe and the second subframe are subframes of an unlicensed carrier.

20 Claims, 9 Drawing Sheets

(51) Int. Cl.
*H04B 1/7073* (2011.01)
*H04L 5/00* (2006.01)
(52) U.S. Cl.
CPC .......... *H04L 5/0048* (2013.01); *H04L 5/0082* (2013.01); *H04L 27/2613* (2013.01); *H04L 27/2666* (2013.01); *H04W 56/00* (2013.01); *H04L 5/0007* (2013.01); *H04L 27/2675* (2013.01); *H04L 27/2678* (2013.01)

(56) References Cited

U.S. PATENT DOCUMENTS

| | | | |
|---|---|---|---|
| 2014/0086111 | A1 | 3/2014 | Li et al. |
| 2014/0092862 | A1 | 4/2014 | Noh et al. |
| 2015/0063293 | A1 | 3/2015 | Lee et al. |
| 2015/0098435 | A1 | 4/2015 | Nam et al. |

FOREIGN PATENT DOCUMENTS

| | | |
|---|---|---|
| CN | 103686978 A | 3/2014 |
| CN | 103686987 A | 3/2014 |
| CN | 104009784 A | 8/2014 |

OTHER PUBLICATIONS

Foreign Communication From a Counterpart Application, PCT Application No. PCT/CN2015/071221, English Translation of Written Opinion dated Jul. 29, 2015, 6 pages.

"3rd Generation Partnership Project; Technical Specification Group Radio Access Network; Evolved Universal Terrestrial Radio Access (E-UTRA); Physical channels and modulation (Release 12)," XP050919533, DRAFT3GPP TS 36.211, V12.4.0, Technical Specification, Dec. 2014, 124 pages.

Foreign Communication From a Counterpart Application, European Application No. 15878373.8, Extended European Search Report dated Nov. 3, 2017, 9 pages.

Intel Corporation, "Views on synchronized new carrier," R1-130079, 3GPP TSG-RAN WG1 #72, St Julian's, Malta, Jan. 28-Feb. 1, 2013, 4 pages.

China Telecom, "Design for Synchronized NCT," R1-130352, 3GPP TSG RAN WG1 Meeting #72, St Julian's, Malta, Jan. 28-Feb. 1, 2013, 4 pages.

Foreign Communication From a Counterpart Application, Korean Application No. 10-2017-7022998, Korean Office Action dated Aug. 14, 2019, 4 pages.

Foreign Communication From a Counterpart Application, Korean Application No. 10-2017-7022998, English Translation of Korean Office Action dated Aug. 14, 2019, 3 pages.

Machine Translation and Abstract of Chinese Publication No. CN103686978, dated Mar. 26, 2014, 6 pages.

Foreign Communication From a Counterpart Application, Chinese Application No. 201580066976.1, Chinese Office Action dated Apr. 1, 2019, 9 pages.

\* cited by examiner

SYNCHRONIZATION METHOD, APPARATUS, AND SYSTEM

CROSS REFERENCE TO RELATED APPLICATIONS

This application is a U.S. National Stage of International Patent Application No. PCT/CN2015/071221 filed Jan. 21, 2015, which is incorporated herein by reference in its entirety.

TECHNICAL FIELD

Embodiments of the present disclosure relate to the communications field, and in particular, to a synchronization method, an apparatus, and a system.

BACKGROUND

In a wireless communications system, data communication is performed between devices by sending and receiving a signal. Before data communication is performed, a receiving device needs to perform data frame synchronization with a sending device. To implement the data frame synchronization between the receiving device and the sending device, the sending device needs to send a synchronization signal. The receiving device implements frequency synchronization and time synchronization by detecting the known synchronization signal. Afterward, the receiving device further needs to periodically detect a synchronization signal, to maintain the frequency synchronization and the time synchronization. Otherwise, the data frame synchronization may be lost in a subsequent data communication process.

In a Long Term Evolution (LTE) system with a licensed carrier, by means of coarse synchronization, a frequency domain deviation is within a half subcarrier width, and an approximate range of time synchronization is determined, and by means of fine synchronization, the frequency domain deviation is further reduced, and an arrival time of a first path is accurately determined in order to complete a whole synchronization process. The coarse synchronization is implemented using a primary synchronization signal (PSS) and a secondary synchronization signal (SSS). The fine synchronization is implemented using a cell-specific reference signal (CRS). It is generally considered that in an LTE system, a time in which a receiver needs to obtain again synchronization is 40 milliseconds (ms), and a period in which the receiver needs to continuously trace the synchronization is 5 ms. In the LTE system with a licensed carrier, the system may continuously occupy a carrier, and therefore, the system may send synchronization signals (a coarse synchronization signal and a fine synchronization signal) according to a synchronization requirement. In the LTE system, a signal for coarse synchronization is sent at an interval of 5 ms. A signal for fine synchronization is sent at an interval of 0.285 ms.

However, on an unlicensed carrier, a time in which a system occupies the unlicensed carrier is neither continuous nor periodic because the unlicensed carrier is accessed in a contention manner. Consequently, the system cannot ensure that a signal for synchronization can be sent continuously and periodically. Therefore, a new data frame synchronization method needs to be designed for an unlicensed carrier in order to implement data frame synchronization on the unlicensed carrier.

SUMMARY

Embodiments of the present disclosure provide a synchronization method, an apparatus, and a system, and relate to the communications field in order to implement synchronization of data frame transmission between devices on an unlicensed carrier.

According to a first aspect, a synchronization method is provided, including setting, by a network device, a synchronization signal in a first subframe, and sending, by the network device, the first subframe or the first subframe and a second subframe to user equipment, where the first subframe includes M orthogonal frequency division multiplexing (OFDM) symbols, and the second subframe includes N OFDM symbols, where M and N are positive integers, M>N, and the first subframe and the second subframe are subframes of an unlicensed carrier.

With reference to the first aspect, in a first possible implementation, setting, by a network device, a synchronization signal in a first subframe includes setting, by the network device, the synchronization signal in a preset symbol of the first subframe.

With reference to the first possible implementation of the first aspect, in a second possible implementation, the first subframe includes four CRSs, and setting, by a network device, a synchronization signal in a first subframe includes setting, by the network device, the synchronization signal in a third symbol of the first subframe.

With reference to the first possible implementation of the first aspect, in a third possible implementation, the first subframe includes one CRS port or two CRS ports, and setting, by a network device, a synchronization signal in a first subframe includes setting, by the network device, the synchronization signal in a second symbol of the first subframe.

With reference to the first possible implementation of the first aspect, in a fourth possible implementation, the first subframe includes no CRS, and setting, by a network device, a synchronization signal in a first subframe includes setting, by the network device, the synchronization signal in a first symbol of the first subframe.

With reference to the first possible implementation of the first aspect, in a fifth possible implementation, the first subframe includes two timeslots, and setting, by a network device, a synchronization signal in a first subframe includes setting, by the network device, the synchronization signal in the last symbol or the last but one symbol of a first timeslot in the first subframe.

With reference to the first aspect or any possible implementation of the first aspect, in a sixth possible implementation, the synchronization signal includes at least one of the following a PSS or an SSS.

According to a second aspect, a synchronization method is provided, including receiving, by user equipment, a first subframe or the first subframe and a second subframe sent by a network device, where the first subframe includes M OFDM symbols, the second subframe includes N OFDM symbols, M and N are positive integers, and M>N, determining, by the user equipment, a location range of an OFDM symbol that is in the first subframe and that carries a synchronization signal, obtaining, by the user equipment, the synchronization signal according to the location range of the OFDM symbol, and performing, by the user equipment, synchronization according to the synchronization signal, where the first subframe and the second subframe are subframes of an unlicensed carrier.

With reference to the second aspect, in a first possible implementation, determining, by the user equipment, a location range of an OFDM symbol that is in the first subframe and that carries a synchronization signal includes obtaining, by the user equipment, a start location of a third subframe, and determining, by the user equipment, the location range of the OFDM symbol according to the start location of the third subframe, a cyclic prefix (CP) of the OFDM symbol, and a quantity of CRSs of the first subframe, where the third subframe is a subframe of a licensed carrier.

With reference to the second aspect, in a second possible implementation, the method further includes detecting, by the user equipment, a CRS of the second subframe, and obtaining, by the user equipment, a start location of the second subframe according to the CRS, where the start location of the second subframe is a location of the first OFDM symbol of the second subframe sent by the network device and received by the user equipment.

With reference to the second aspect or either possible implementation of the second aspect, in a third possible implementation, the synchronization signal includes at least one of the following a PSS or an SSS.

According to a third aspect, a network device is provided, including a setting unit configured to set a synchronization signal in a first subframe, and a sending unit configured to send the first subframe or the first subframe and a second subframe to user equipment, where the first subframe includes M OFDM symbols, and the second subframe includes N OFDM symbols, where M and N are positive integers, M>N, and the first subframe and the second subframe are subframes of an unlicensed carrier.

With reference to the third aspect, in a first possible implementation, the setting unit is configured to set the synchronization signal in a preset symbol of the first subframe.

With reference to the first possible implementation of the third aspect, in a second possible implementation, the first subframe includes four CRSs, and the setting unit is further configured to set the synchronization signal in a third symbol of the first subframe.

With reference to the first possible implementation of the third aspect, in a third possible implementation, the first subframe includes one CRS port or two CRS ports, and the setting unit is further configured to set the synchronization signal in a second symbol of the first subframe.

With reference to the first possible implementation of the third aspect, in a fourth possible implementation, the first subframe includes no CRS, and the setting unit is further configured to set the synchronization signal in a first symbol of the first subframe.

With reference to the first possible implementation of the third aspect, in a fifth possible implementation, the first subframe includes two timeslots, and the setting unit is further configured to set the synchronization signal in the last symbol or the last but one symbol of a first timeslot in the first subframe.

With reference to the third aspect or any possible implementation of the third aspect, in a sixth possible implementation, the synchronization signal includes at least one of the following, a PSS or an SSS.

According to a fourth aspect, user equipment is provided, including a receiving unit configured to receive a first subframe or the first subframe and a second subframe sent by a network device, where the first subframe includes M OFDM symbols, the second subframe includes N OFDM symbols, M and N are positive integers, and M>N, a location determining unit configured to determine a location range of an OFDM symbol that is in the first subframe received by the receiving unit and that carries a synchronization signal, an obtaining unit configured to obtain the synchronization signal according to the location range that is of the OFDM symbol and that is determined by the location determining unit, and a synchronization unit configured to perform synchronization according to the synchronization signal obtained by the obtaining unit, where the first subframe and the second subframe are subframes of an unlicensed carrier.

With reference to the fourth aspect, in a first possible implementation, the location determining unit is further configured to obtain a start location of a third subframe, and determine the location range of the OFDM symbol according to the start location of the third subframe, a CP of the OFDM symbol, and a quantity of CRSs of the first subframe, where the third subframe is a subframe of a licensed carrier.

With reference to the fourth aspect, in a second possible implementation, the user equipment further includes a detection unit configured to detect a CRS of the second subframe, and the location determining unit is further configured to obtain a start location of the second subframe according to the CRS detected by the detection unit, where the start location of the second subframe is a location of the first OFDM symbol of the second subframe sent by the network device and received by the user equipment.

With reference to the fourth aspect or either possible implementation of the fourth aspect, the synchronization signal includes at least one of the following, a PSS or an SSS.

According to a fifth aspect, a network device is provided, including a processor, an interface circuit, a memory, and a bus, where the processor, the interface circuit, and the memory are connected and communicate with each other using the bus, where the processor is configured to set a synchronization signal in a first subframe, and the interface circuit is configured to send the first subframe or the first subframe and a second subframe to user equipment, where the first subframe includes M OFDM symbols, and the second subframe includes N OFDM symbols, where M and N are positive integers, M>N, and the first subframe and the second subframe are subframes of an unlicensed carrier.

With reference to the fifth aspect, in a first possible implementation, the processor is configured to set the synchronization signal in a preset symbol of the first subframe.

With reference to the first possible implementation of the fifth aspect, in a second possible implementation, the first subframe includes four CRSs, and the processor is further configured to set the synchronization signal in a third symbol of the first subframe.

With reference to the first possible implementation of the fifth aspect, in a third possible implementation, the first subframe includes one CRS port or two CRS ports, and the processor is further configured to set the synchronization signal in a second symbol of the first subframe.

With reference to the first possible implementation of the fifth aspect, in a fourth possible implementation, the first subframe includes no CRS, and the processor is further configured to set the synchronization signal in a first symbol of the first subframe.

With reference to the first possible implementation of the fifth aspect, in a fifth possible implementation, the first subframe includes two timeslots, and the processor is further configured to set the synchronization signal in the last symbol or the last but one symbol of a first timeslot in the first subframe.

With reference to the fifth aspect or any possible implementation of the fifth aspect, in a sixth possible implementation, the synchronization signal includes at least one of the following, a PSS or an SSS.

According to a sixth aspect, user equipment is provided, including a processor, an interface circuit, a memory, and a bus, where the processor, the interface circuit, and the memory are connected and communicate with each other using the bus, where the interface circuit is configured to receive a first subframe or the first subframe and a second subframe sent by a network device, where the first subframe includes M OFDM symbols, the second subframe includes N OFDM symbols, M and N are positive integers, and M>N, and the processor is configured to determine a location range of an OFDM symbol that is in the first subframe received by the interface circuit and that carries a synchronization signal, obtain the synchronization signal according to the location range of the OFDM symbol, and perform synchronization according to the synchronization signal, where the first subframe and the second subframe are subframes of an unlicensed carrier.

With reference to the sixth aspect, in a first possible implementation, the processor is further configured to obtain a start location of a third subframe, and determine the location range of the OFDM symbol according to the start location of the third subframe, a CP of the OFDM symbol, and a quantity of CRSs of the first subframe, where the third subframe is a subframe of a licensed carrier.

With reference to the sixth aspect, in a second possible implementation, the processor is further configured to detect a CRS of the second subframe, and obtain a start location of the second subframe according to the CRS, where the start location of the second subframe is a location of the first OFDM symbol of the second subframe sent by the network device and received by the user equipment.

With reference to the sixth aspect or either possible implementation of the sixth aspect, the synchronization signal includes at least one of the following, a PSS or an SSS.

According to a seventh aspect, a communications system is provided, including any network device provided in the third aspect and any user equipment provided in the fourth aspect, or any network device provided in the fifth aspect and any user equipment provided in the sixth aspect.

According to the synchronization method, the apparatus, and the system that are provided above, in a subframe of an unlicensed carrier, a network device sets a synchronization signal in a first subframe, and sends the first subframe carrying the synchronization signal to user equipment such that the user equipment obtains the synchronization signal from the received first subframe and performs synchronization, thereby implementing synchronization of data frame transmission between devices on the unlicensed carrier.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
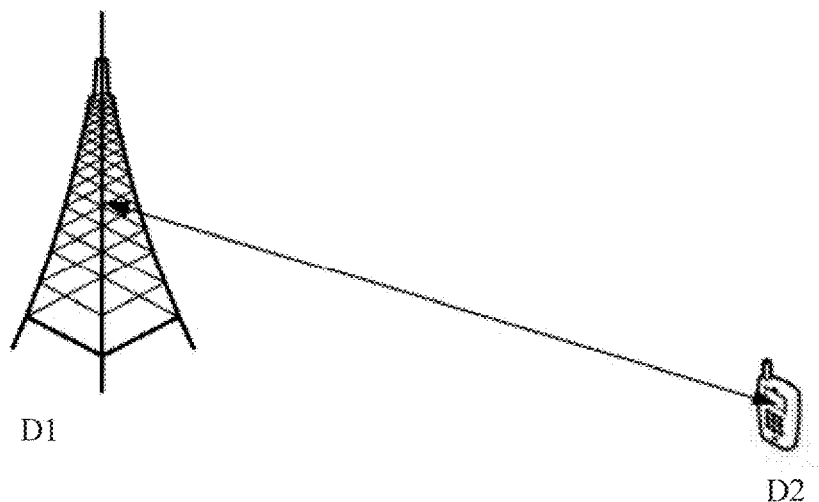
FIG. 1 is a schematic structural diagram of a communications system according to an embodiment of the present disclosure.

Multiple embodiments are now described with reference to the accompanying drawings, and same components in this specification are indicated by a same reference numeral. In the following description, for ease of explanation, many specific details are provided to facilitate comprehensive understanding of one or more embodiments. However, the embodiments may either not be implemented using these specific details. In other examples, a well-known structure and device are shown in a form of block diagrams, to conveniently describe one or more embodiments.

It should be understood that, the technical solutions of the embodiments of the present disclosure may be applied to various communications systems, such as a Global System for Mobile Communications (GSM) system, a Code Division Multiple Access (CDMA) system, a Wideband Code Division Multiple Access (WCDMA) system, a general packet radio service (GPRS), an LTE system, an LTE frequency division duplex (FDD) system, an LTE time division duplex (TDD), Universal Mobile Telecommunications System (UMTS), and a Worldwide Interoperability for Microwave Access (WIMAX) communications system.

User equipment provided in the embodiments of the present disclosure may be a cellular phone, a cordless phone, a Session Initiation Protocol (SIP) phone, a wireless local loop (WLL) station, a personal digital assistant (PDA), a handheld device having a wireless communication function, an in-vehicle device, a wearable device, a computing device, or another device connected to a wireless modem.

A network device provided in the embodiments of the present disclosure may be a base station, and the base station may refer to a device communicating with user equipment using one or more sectors on an air interface in an access network. The base station may be configured to mutually convert a received over-the-air frame and an Internet Protocol (IP) packet, and serve as a router between the user equipment and a remaining portion of the access network. The remaining portion of the access network may include an IP network. The base station may further coordinate attribute management of the air interface. The base station may be a base transceiver station (BTS) in the GSM or CDMA, or may be a base station in WCDMA, or may further be an evolved NodeB (eNB or e-NodeB) in LTE, or may be a macro base station or a micro base station in a cellular wireless communications system. This is not limited in the embodiments of the present disclosure.

Terms such as "first" and "second" are only for a description purpose, and cannot be understood as an indication or an implication of importance or cannot imply a quantity of indicated technical features. Therefore, features defined by the "first" and the "second" may explicitly or implicitly include one or more features. In the following embodiments, the "first" and the "second" are only used for distinguishing, for example, a first subframe and a second subframe.

The embodiments of the present disclosure are applied to a communications system shown in FIG. 1, including a network device D1 and user equipment D2. The network device D1 and the user equipment D2 need to perform data frame synchronization on an unlicensed carrier.

Figure 2:
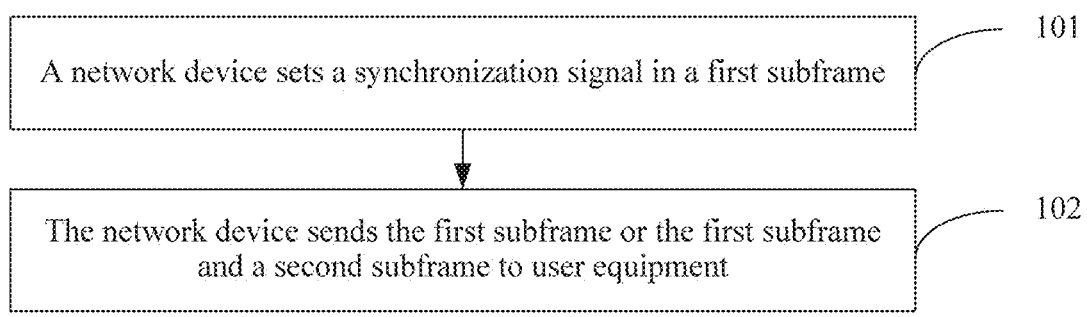
FIG. 2 is a schematic flowchart of a synchronization method according to an embodiment of the present disclosure.

Further, an embodiment of the present disclosure provides a synchronization method applied to the foregoing communications system in order to implement data frame synchronization on an unlicensed carrier. Referring to FIG. 2, the following steps are included at a network device side.

Step 101: A network device sets a synchronization signal in a first subframe.

Further, as shown in step 101 the network device sets the synchronization signal in a preset symbol of the first subframe, where the synchronization signal includes a coarse synchronization signal and a fine synchronization signal. For example, the network device sets a coarse synchronization signal in a first preset symbol of the first subframe. A location of the first preset symbol in the first subframe may be determined by referring to a quantity of CRS ports used on an unlicensed carrier. For example, the network device sets a fine synchronization signal in a second preset symbol and a third preset symbol of the first subframe. Locations of the second preset symbol and the third preset symbol in the first subframe may be determined by referring to a length of a CP included in data on an unlicensed carrier.

Step 102: The network device sends the first subframe or the first subframe and a second subframe to user equipment.

The first subframe includes M OFDM symbols, and the second subframe includes N OFDM symbols, where M and N are positive integers, M>N, and the first subframe and the second subframe are subframes of an unlicensed carrier. For example, M=14 or 12. Referring to a radio frame structure of an LTE system, each data frame includes some subframes, each subframe includes two timeslots, and the two timeslots are usually defined as an odd-numbered timeslot and an even-numbered timeslot. When a CP included in data on an unlicensed carrier is a normal CP (NCP), M=14, and each timeslot is used to transmit seven OFDM symbols, or when a CP included in data on an unlicensed carrier is an extended CP (ECP), M=12, and each timeslot is used to transmit six OFDM symbols. Because M>N, the second subframe is an incomplete subframe.

According to the synchronization method provided above, in a subframe of an unlicensed carrier, a network device sets a synchronization signal in a first subframe, and sends the first subframe carrying the synchronization signal to user equipment such that the user equipment obtains the synchronization signal from the received first subframe and performs synchronization, thereby implementing synchronization of data frame transmission between devices on the unlicensed carrier.

Figure 3:
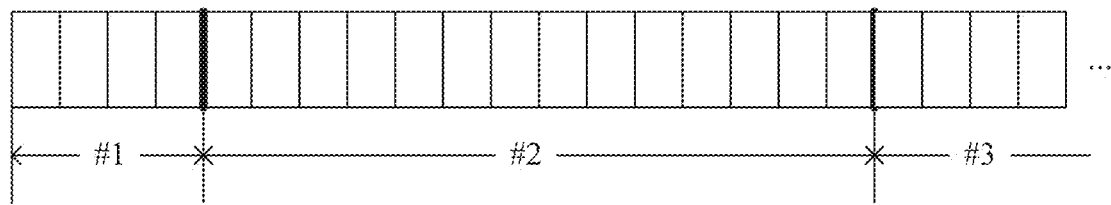
FIG. 3 is a schematic structural diagram of a data frame according to an embodiment of the present disclosure.

Further, referring to a radio frame structure of an LTE system in other approaches, the following is based on a case in which an NCP is used on an unlicensed carrier, and four CRS ports are used to transmit 32 symbols. The last 28 symbols of a data frame shown in FIG. 3 form two subframes. For ease of description, the first four symbols of the data frame (four symbols including the first one to the fourth one shown in FIG. 3) are defined as an incomplete subframe #1, and the last 28 symbols of the data frame form subframes #2 and #3. The subframes #2 and #3 are used as the first subframe in the present disclosure, and the subframe #1 is used as the second subframe.

Figure 4:
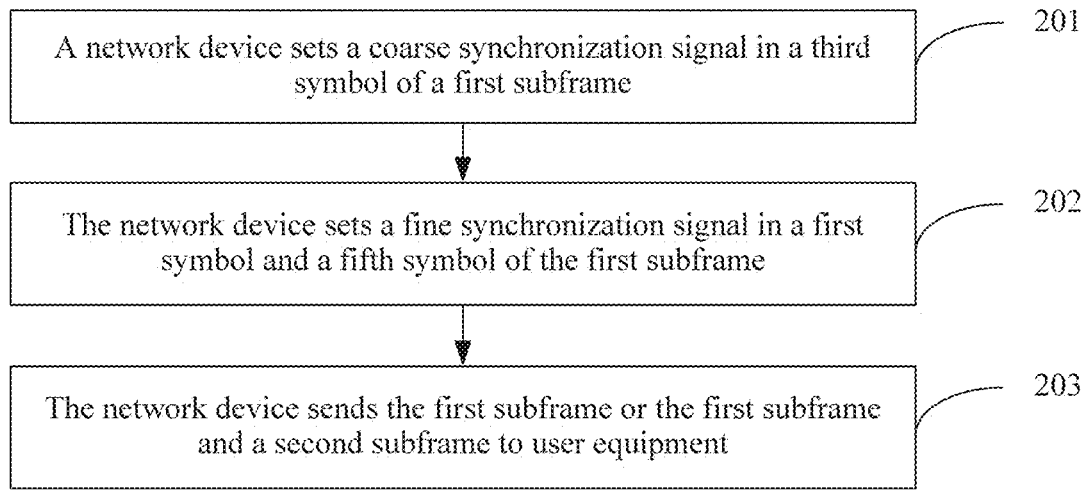
FIG. 4 is a schematic flowchart of a synchronization method according to another embodiment of the present disclosure.

Based on a case of an NCP, referring to FIG. 4, an embodiment of the present disclosure provides a synchronization method, including the following steps.

Step 201: A network device sets a coarse synchronization signal in a third symbol of a first subframe.

The coarse synchronization signal includes at least one of the following, a PSS or an SSS.

Step 202: The network device sets a fine synchronization signal in a first symbol and a fifth symbol of the first subframe.

Figure 5:
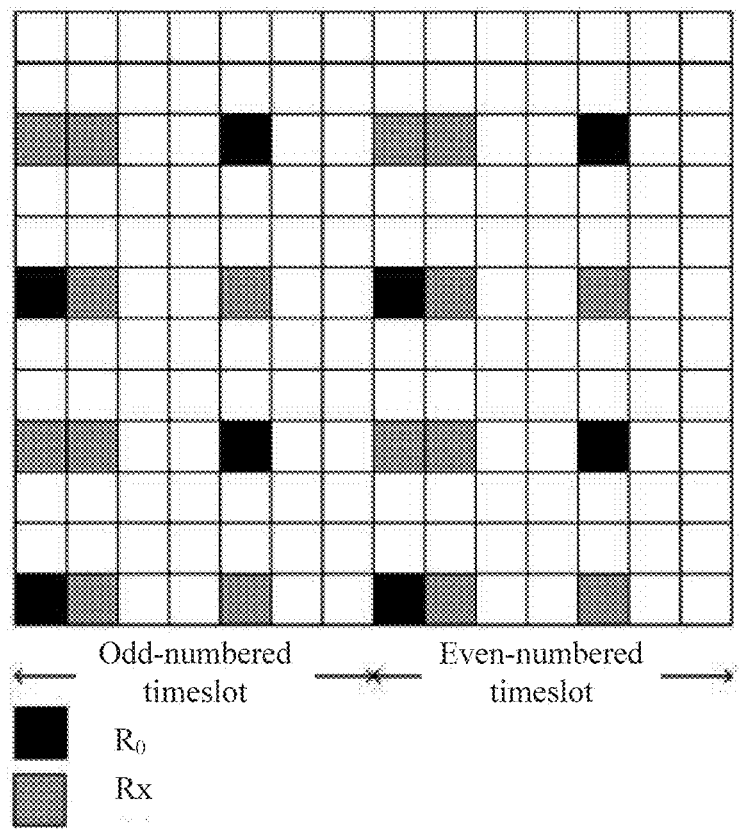
FIG. 5 is a schematic diagram of resource block allocation according to an embodiment of the present disclosure.

The fine synchronization signal includes a CRS. Further, referring to FIG. 5, FIG. 5 is a schematic diagram of resource block allocation in a case of four CRS ports. According to a mapping relationship between an antenna port and a resource block, an actual mapping location $R_0$ of the antenna port in the resource block and a possible mapping location $R_x$ of the antenna port in the resource block are shown in FIG. 5. The network device sets a CRS in the first symbol and the fifth symbol of the first subframe, and sets a PSS and/or an SSS in the most front third symbol in the possible location in order to reduce a delay of coarse synchronization performed by user equipment.

In a preferred manner, the network device sets the coarse synchronization signal in the first symbol of the first subframe when an unlicensed carrier uses a CRS port such that the user equipment first performs coarse synchronization. Certainly, this is just one implementation. In an optional implementation, step 201 may be replaced with the following. The network device sets a coarse synchronization signal in the last symbol or the last but one symbol of a first timeslot in the first subframe. Alternatively, the network device sets a coarse synchronization signal in any another possible symbol of the first subframe.

Step 203: The network device sends the first subframe or the first subframe and a second subframe to user equipment.

According to the data transmission method provided above, in a subframe of an unlicensed carrier, a network device sets a synchronization signal in a first subframe, and sends the first subframe carrying the synchronization signal to user equipment such that the user equipment obtains the synchronization signal from the received first subframe and performs synchronization, thereby implementing synchronization of data frame transmission between devices on the unlicensed carrier.

The following is based on a case in which an NCP is used on an unlicensed carrier, and one or two CRS ports are used to transmit 32 symbols. The last 28 symbols of a data frame shown in FIG. 3 form two subframes. For ease of description, the first four symbols of the data frame (four symbols including the first one to the fourth one shown in FIG. 3) are defined as an incomplete subframe #1, and the last 28 symbols of the data frame form subframes #2 and #3. The subframes #2 and #3 are used as the first subframe in the present disclosure, and the subframe #1 is used as the second subframe.

Figure 6:
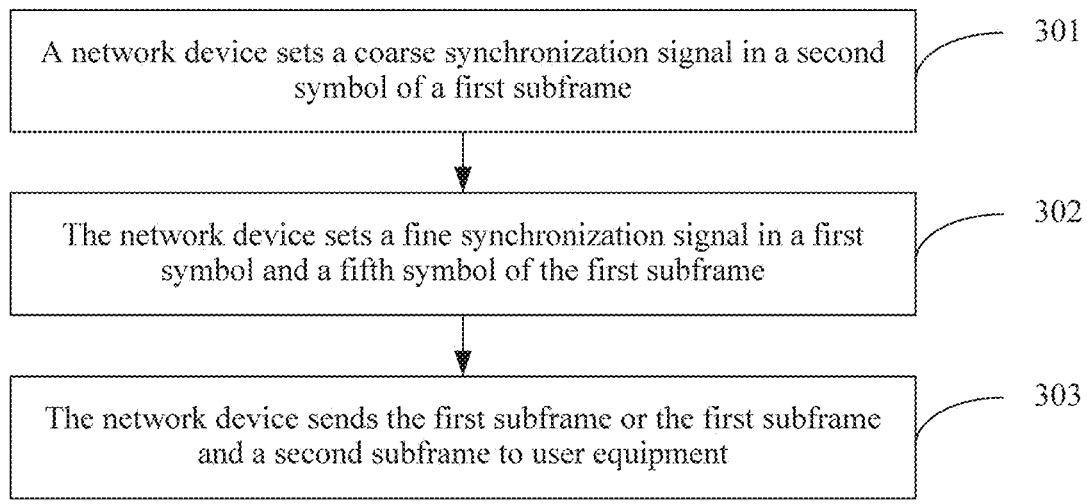
FIG. 6 is a schematic flowchart of a synchronization method according to still another embodiment of the present disclosure.

Based on a case of an NCP, referring to FIG. 6, an embodiment of the present disclosure provides a synchronization method, including the following steps.

Step 301: A network device sets a coarse synchronization signal in a second symbol of a first subframe.

The coarse synchronization signal includes at least one of the following, a PSS or an SSS.

Step 302: The network device sets a fine synchronization signal in a first symbol and a fifth symbol of the first subframe.

Figure 7:
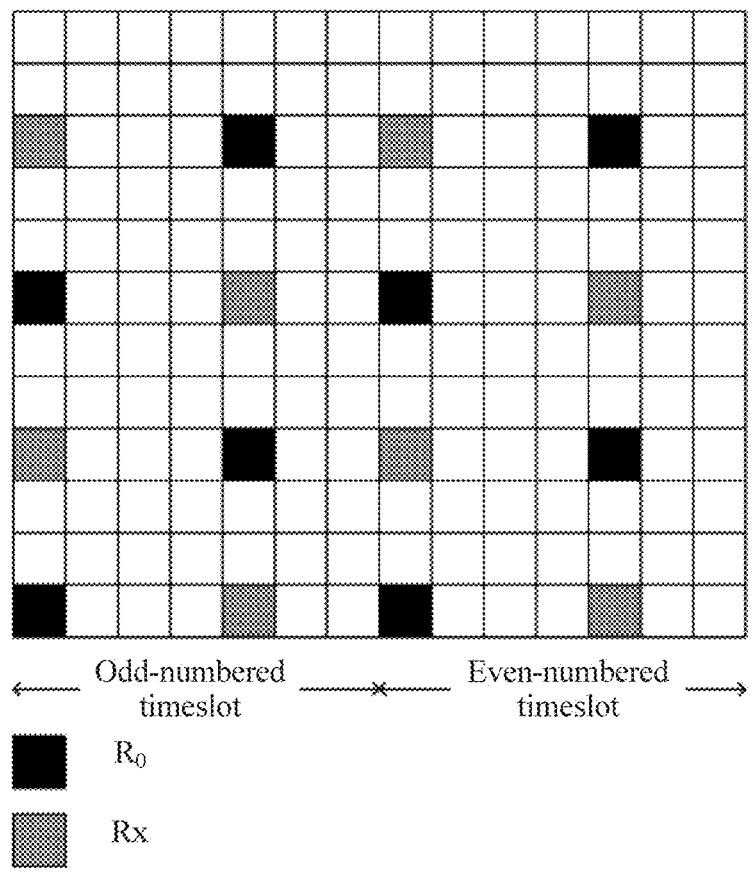
FIG. 7 is a schematic diagram of resource block allocation according to another embodiment of the present disclosure.

The fine synchronization signal includes a CRS. Further, an actual mapping location $R_0$ of an antenna port in a resource block and a possible mapping location $R_x$ of the antenna port in the resource block are shown in FIG. 7. The network device sets a CRS in the first symbol and the fifth symbol of the first subframe, and sets a PSS and/or an SSS in the most front second symbol in the possible location in order to reduce a delay of coarse synchronization performed by user equipment.

In a preferred manner, the network device sets the coarse synchronization signal in the first symbol of the first subframe when an unlicensed carrier uses a CRS port such that the user equipment first performs coarse synchronization. Certainly, this is just one implementation. In an optional implementation, step 301 may be replaced with the following. The network device sets a coarse synchronization signal in the last symbol or the last but one symbol of a first timeslot in the first subframe, or the network device sets a coarse synchronization signal in any another possible symbol of the first subframe.

Step 303. The network device sends the first subframe or the first subframe and a second subframe to user equipment.

According to the data transmission method provided above, in a subframe of an unlicensed carrier, a network device sets a synchronization signal in a first subframe, and sends the first subframe carrying the synchronization signal to user equipment such that the user equipment obtains the synchronization signal from the received first subframe and performs synchronization, thereby implementing synchronization of data frame transmission between devices on the unlicensed carrier.

Figure 8:
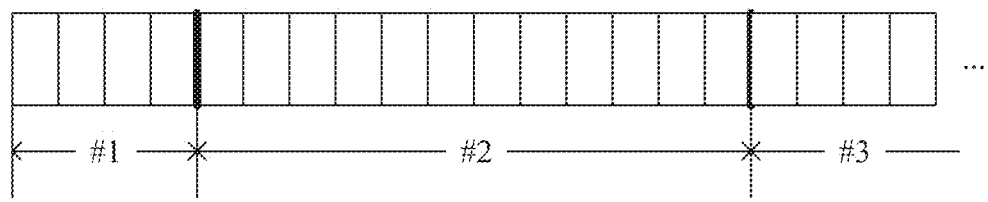
FIG. 8 is a schematic structural diagram of a data frame according to another embodiment of the present disclosure.

The following is based on a case in which an ECP is used on an unlicensed carrier, and four CRS ports are used to transmit 28 symbols. The last 24 symbols of a data frame shown in FIG. 8 form two subframes. For ease of description, the first four symbols of the data frame (four symbols including the first one to the fourth one shown in FIG. 8) are defined as an incomplete subframe #1, and the last 24 symbols of the data frame form subframes #2 and #3. The subframes #2 and #3 are used as the first subframe in the present disclosure, and the subframe #1 is used as the second subframe.

Figure 9:
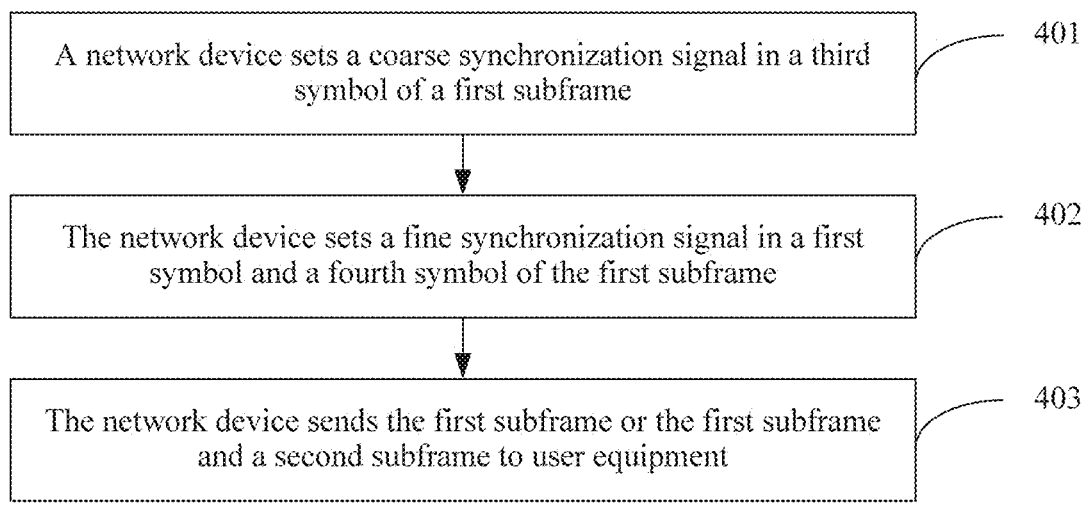
FIG. 9 is a schematic flowchart of a synchronization method according to yet another embodiment of the present disclosure.

Based on a case of an ECP, referring to FIG. 9, an embodiment of the present disclosure provides a data transmission method, including the following steps.

Step 401: A network device sets a coarse synchronization signal in a third symbol of a first subframe.

The coarse synchronization signal includes at least one of the following, a PSS or an SSS.

Step 402: The network device sets a fine synchronization signal in a first symbol and a fourth symbol of the first subframe.

Figure 10:
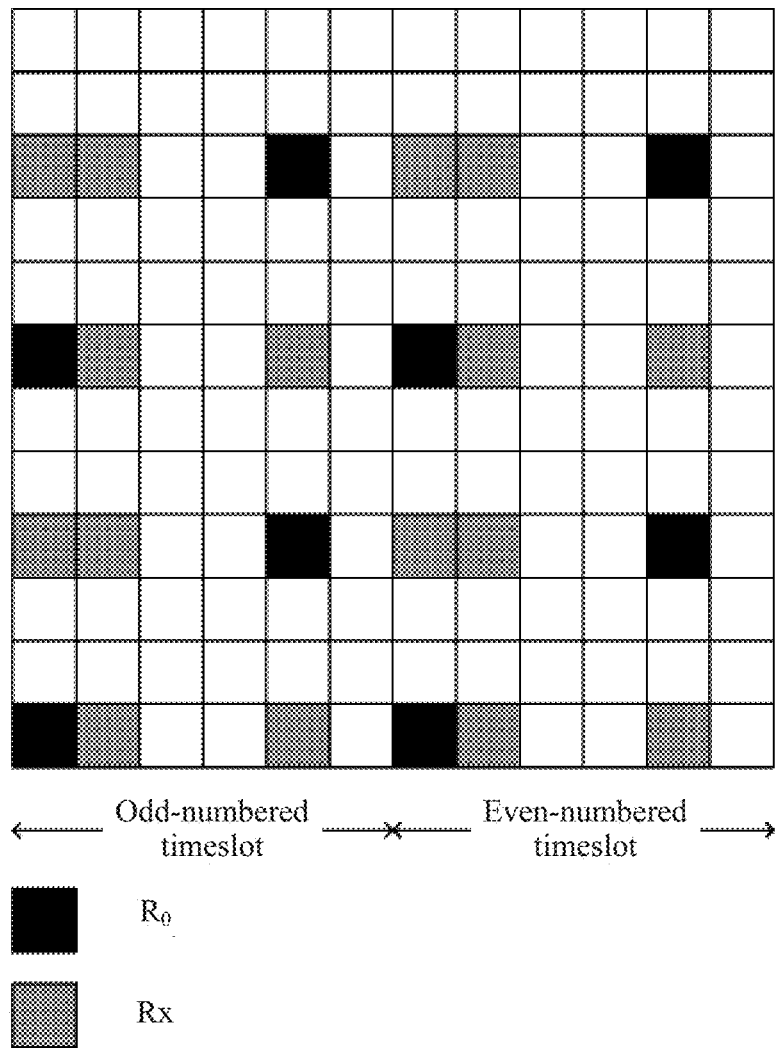
FIG. 10 is a schematic diagram of resource block allocation according to still another embodiment of the present disclosure.

The fine synchronization signal includes a CRS. Further, referring to FIG. 10, FIG. 10 is a schematic diagram of resource block allocation in a case of four CRS ports. According to a mapping relationship between an antenna port and a resource block, an actual mapping location $R_0$ of the antenna port in the resource block and a possible mapping location $R_x$ of the antenna port in the resource block are shown in FIG. 10. The network device sets a CRS in the first symbol and the fourth symbol of the first subframe, and sets a PSS and/or an SSS in the most front third symbol in the possible location in order to reduce a delay of coarse synchronization performed by user equipment.

In a preferred manner, the network device sets the coarse synchronization signal in the first symbol of the first subframe when an unlicensed carrier uses a CRS port such that the user equipment first performs coarse synchronization. Certainly, this is just one implementation. In an optional implementation, step 401 may be replaced with the following. The network device sets a coarse synchronization signal in the last symbol or the last but one symbol of a first timeslot in the first subframe. Alternatively, the network device sets a coarse synchronization signal in any another possible symbol of each subframe.

Step 403: The network device sends the first subframe or the first subframe and a second subframe to user equipment.

According to the data transmission method provided above, in a subframe of an unlicensed carrier, a network device sets a synchronization signal in a first subframe, and sends the first subframe carrying the synchronization signal to user equipment such that the user equipment obtains the synchronization signal from the received first subframe and performs synchronization, thereby implementing synchronization of data frame transmission between devices on the unlicensed carrier.

The following is based on a case in which an extended is used on an unlicensed carrier, and four CRS ports are used to transmit 28 symbols. The last 24 symbols of a data frame shown in FIG. 8 form two subframes. For ease of description, the first four symbols of the data frame (four symbols including the first one to the fourth one shown in FIG. 8) are defined as an incomplete subframe #1, and the last 24 symbols of the data frame form subframes #2 and #3. The subframes #2 and #3 are used as the first subframe in the present disclosure, and the subframe #1 is used as the second subframe.

Figure 11:
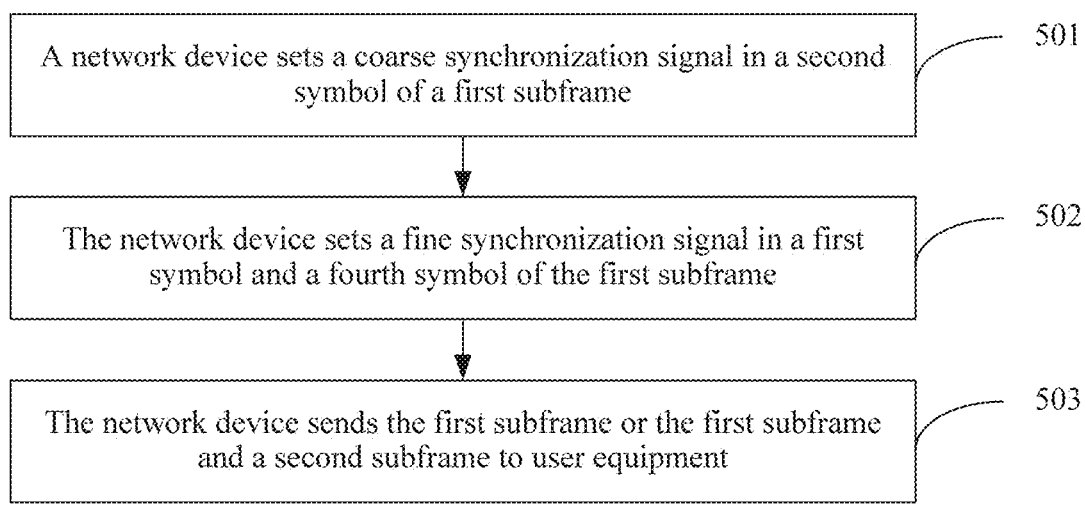
FIG. 11 is a schematic flowchart of a synchronization method according to another embodiment of the present disclosure.

Based on a case of an ECP, referring to FIG. 11, an embodiment of the present disclosure provides a data transmission method, including the following steps.

Step 501: A network device sets a coarse synchronization signal in a second symbol of a first subframe.

The coarse synchronization signal includes at least one of the following, a PSS or an SSS.

Step 502: The network device sets a fine synchronization signal in a first symbol and a fourth symbol of the first subframe.

Figure 12:
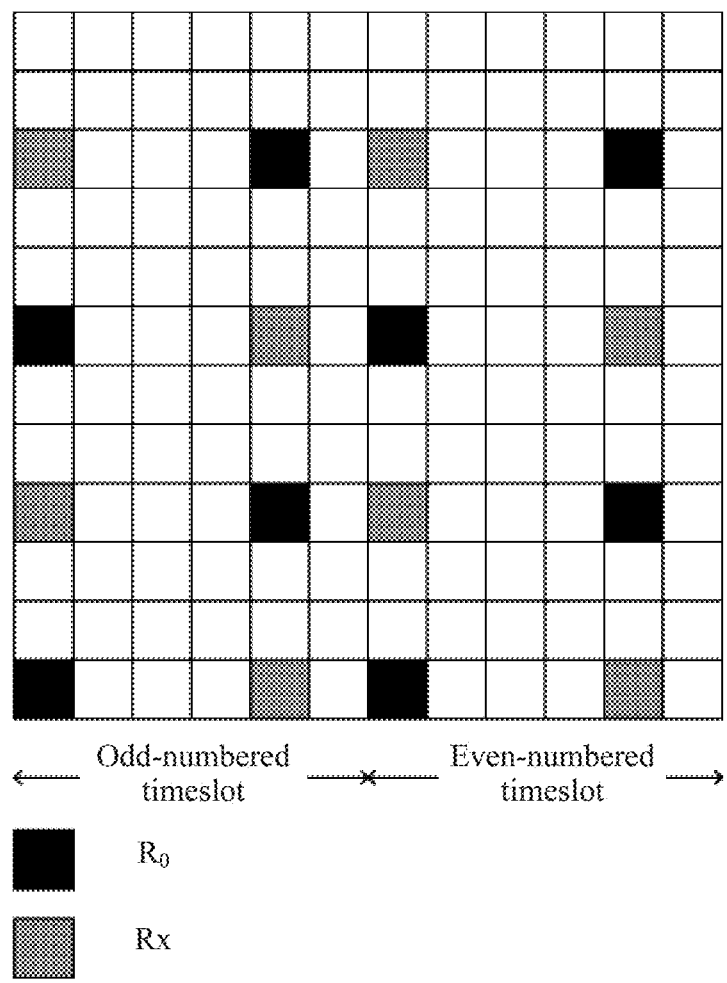
FIG. 12 is a schematic diagram of resource block allocation according to yet another embodiment of the present disclosure.

The fine synchronization signal includes a CRS. Further, referring to FIG. 12, FIG. 12 is a schematic diagram of resource block allocation in a case of four CRS ports. According to a mapping relationship between an antenna port and a resource block, an actual mapping location R0 of the antenna port in the resource block and a possible mapping location Rx of the antenna port in the resource block are shown in FIG. 12. The network device sets a CRS in the first symbol and the fourth symbol of the first subframe, and sets a PSS and/or an SSS in the most front second symbol in the possible location in order to reduce a delay of coarse synchronization performed by user equipment.

In a preferred manner, the network device sets the coarse synchronization signal in the first symbol of the first subframe when an unlicensed carrier uses a CRS port such that the user equipment first performs coarse synchronization. Certainly, this is just one implementation. In an optional implementation, step 501 may be replaced with the following. The network device sets a coarse synchronization signal in the last symbol or the last but one symbol of a first timeslot in the first subframe. Alternatively, the network device sets a coarse synchronization signal in any another possible symbol of each subframe.

Step 503: The network device sends the first subframe or the first subframe and a second subframe to user equipment.

According to the data transmission method provided above, in a subframe of an unlicensed carrier, a network device sets a synchronization signal in a first subframe, and sends the first subframe carrying the synchronization signal to user equipment such that the user equipment obtains the synchronization signal from the received first subframe and performs synchronization, thereby implementing synchronization of data frame transmission between devices on the unlicensed carrier.

Figure 13:
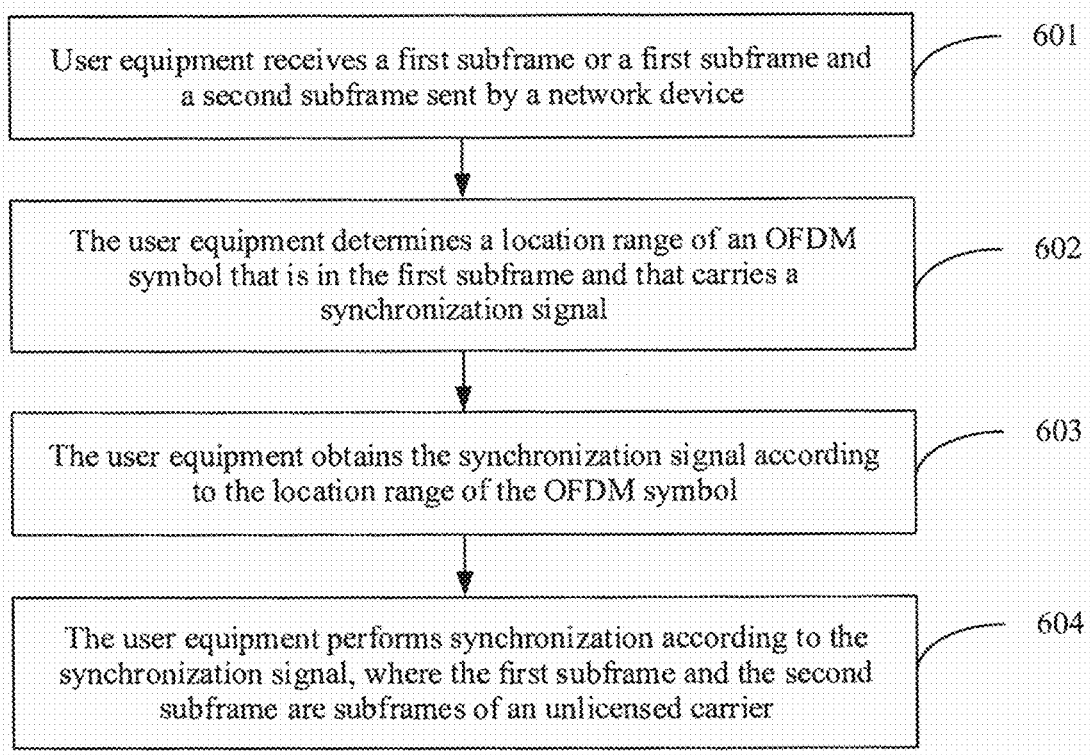
FIG. 13 is a schematic flowchart of a synchronization method according to still another embodiment of the present disclosure.

For user equipment, referring to FIG. 13, an embodiment of the present disclosure provides a data frame synchronization method applied to synchronization on an unlicensed carrier, including the following steps.

Step 601: User equipment receives a first subframe or the first subframe and a second subframe sent by a network device.

The first subframe includes M OFDM symbols, and the second subframe includes N OFDM symbols, where M and N are positive integers, M>N, and the first subframe and the second subframe are subframes of an unlicensed carrier. For example, M=14 or 12. Referring to a radio frame structure of an LTE system, each data frame includes some subframes, each subframe includes two timeslots, and the two timeslots are usually defined as an odd-numbered timeslot and an even-numbered timeslot. When a CP included in data on an unlicensed carrier is an NCP, M=14, and each timeslot is used to transmit seven OFDM symbols, or when a CP included in data on an unlicensed carrier is an ECP, M=12, and each timeslot is used to transmit six OFDM symbols. Because M>N, the second subframe is an incomplete subframe when the user equipment receives the second subframe.

Step 602: The user equipment determines a location range of an OFDM symbol that is in the first subframe and that carries a synchronization signal.

Further, it is clearly recorded in the foregoing embodiment that a network side device determines the OFDM symbol carrying the synchronization signal mainly according to a CP of the OFDM symbol and a quantity of CRSs of the first subframe. Therefore, step 602 further includes the following steps (not shown).

Step 602a: The user equipment obtains a start location of a third subframe.

The third subframe is a subframe of a licensed carrier. A subframe of a licensed carrier and a subframe of an unlicensed carrier have a same structure, and therefore the location range of the OFDM symbol that is in the first subframe and that carries the synchronization signal may be directly determined according to a start location of the subframe of a licensed carrier.

Step 602b: The user equipment determines the location range of the OFDM symbol according to the start location of the third subframe, a CP of the OFDM symbol, and a quantity of CRSs of the first subframe.

Step 603: The user equipment obtains the synchronization signal according to the location range of the OFDM symbol.

For example, the synchronization signal includes a coarse synchronization signal and a fine synchronization signal. The coarse synchronization signal includes at least one of the following, a PSS or an SSS. The fine synchronization signal includes a CRS.

Step 604: The user equipment performs synchronization according to the synchronization signal, where the first subframe and the second subframe are subframes of an unlicensed carrier.

Further, in step 604, coarse synchronization is performed on the unlicensed carrier according to the coarse synchronization signal, and fine synchronization is performed on the unlicensed carrier by detecting the CRS.

According to the data transmission method provided above, in a subframe of an unlicensed carrier, a network device sets a synchronization signal in a first subframe, and sends the first subframe carrying the synchronization signal to user equipment such that the user equipment obtains the synchronization signal from the received first subframe and performs synchronization, thereby implementing synchronization of data frame transmission between devices on the unlicensed carrier.

Optionally, when the user equipment receives the second subframe, the method further includes detecting, by the user equipment, a CRS of the second subframe, and obtaining, by the user equipment, a start location of the second subframe according to the CRS, where the start location of the second subframe is a location of the first OFDM symbol of the second subframe sent by the network device and received by the user equipment.

In the foregoing solution, when an unlicensed carrier includes an incomplete subframe (a second subframe) in a front of a transmitted data frame, user equipment detects a CRS in the second subframe, and obtains a start location of the second subframe according to the CRS, thereby implementing synchronization of data frame transmission between devices in the whole unlicensed carrier. Certainly, there may also be a complete subframe in the front of the data frame. In this case, a start location of the whole data frame is a location that is of the first OFDM symbol of a first subframe and that is determined in step 602.

Figure 14:
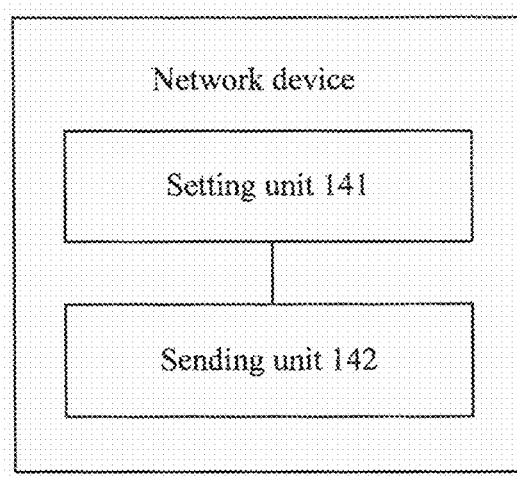
FIG. 14 is a schematic structural diagram of a network device according to an embodiment of the present disclosure.

Referring to FIG. 14, an embodiment of the present disclosure provides a network device that is configured to implement the foregoing synchronization method, including a setting unit 141 configured to set a synchronization signal in a first subframe, and a sending unit 142 configured to send the first subframe or the first subframe and a second subframe to user equipment, where the first subframe includes M OFDM symbols, and the second subframe includes N OFDM symbols, where M and N are positive integers, M>N, and the first subframe and the second subframe are subframes of an unlicensed carrier.

According to the network device provided above, in a subframe of an unlicensed carrier, the network device sets a synchronization signal in a first subframe, and sends the first subframe carrying the synchronization signal to user equipment such that the user equipment obtains the synchronization signal from the received first subframe and performs synchronization, thereby implementing synchronization of data frame transmission between devices on the unlicensed carrier.

Optionally, the setting unit 141 is configured to set the synchronization signal in a preset symbol of the first subframe.

Optionally, the first subframe includes four CRSs.

The setting unit 141 is further configured to set the synchronization signal in a third symbol of the first subframe.

Optionally, the first subframe includes one CRS port or two CRS ports.

The setting unit 141 is further configured to set the synchronization signal in a second symbol of the first subframe.

Optionally, the first subframe includes no CRS.

The setting unit 141 is further configured to set the synchronization signal in a first symbol of the first subframe.

Optionally, the first subframe includes two timeslots.

The setting unit 141 is further configured to set the synchronization signal in the last symbol or the last but one symbol of a first timeslot in the first subframe.

Optionally, the synchronization signal includes at least one of the following, a PSS or an SSS.

It should be noted that the sending unit 142 in this embodiment may be a transmitter of the network device. The setting unit 141 may be a separately disposed processor, or may be implemented by being integrated into a processor of the network device, or may be stored in a memory of a base station in a form of program code, and the foregoing functions of the setting unit 141 are invoked and performed by a processor of the network device. The processor described herein may be a central processing unit (CPU), or an application-specific integrated circuit (ASIC), or one or more integrated circuits configured to implement this embodiment of the present disclosure.

Figure 15:
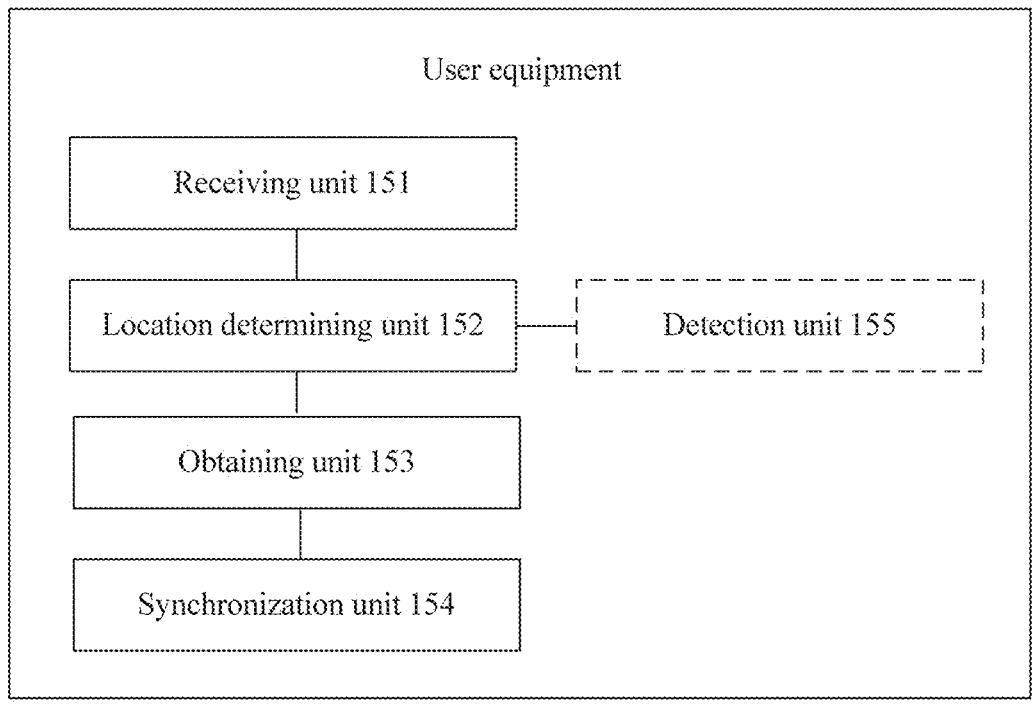
FIG. 15 is a schematic structural diagram of user equipment according to an embodiment of the present disclosure.

Referring to FIG. 15, an embodiment of the present disclosure provides user equipment that is configured to implement the foregoing synchronization method, including a receiving unit 151 configured to receive a first subframe or the first subframe and a second subframe sent by a network device, where the first subframe includes M OFDM symbols, the second subframe includes N OFDM symbols, M and N are positive integers, and M>N, a location determining unit 152 configured to determine a location range of an OFDM symbol that is in the first subframe received by the receiving unit 151 and that carries a synchronization signal, an obtaining unit 153 configured to obtain the synchronization signal according to the location range that is of the OFDM symbol and that is determined by the location determining unit 152, and a synchronization unit 154 configured to perform synchronization according to the synchronization signal obtained by the obtaining unit 153, where the first subframe and the second subframe are subframes of an unlicensed carrier.

According to the user equipment provided above, in a subframe of an unlicensed carrier, a network device sets a synchronization signal in a first subframe, and sends the first subframe carrying the synchronization signal to the user equipment such that the user equipment obtains the synchronization signal from the received first subframe and performs synchronization, thereby implementing synchronization of data frame transmission between devices on the unlicensed carrier.

Optionally, the location determining unit 152 is further configured to obtain a start location of a third subframe, and determine the location range of the OFDM symbol according to the start location of the third subframe, a CP of the OFDM symbol, and a quantity of CRSs of the first subframe, where the third subframe is a subframe of a licensed carrier.

The user equipment further includes a detection unit 155 configured to detect a CRS of the second subframe, and the location determining unit 152 is further configured to obtain a start location of the second subframe according to the CRS detected by the detection unit 155, where the start location of the second subframe is a location of the first OFDM symbol of the second subframe sent by the network device and received by the user equipment.

Optionally, the synchronization signal includes at least one of the following, a PSS or an SSS.

It should be noted that the receiving unit 151 in this embodiment may be a receiver of the user equipment. The location determining unit 152 may be a separately disposed processor, or may be implemented by being integrated into a processor of the user equipment, or may be stored in a memory of the user equipment in a form of program code, and the foregoing functions of the location determining unit 152 are invoked and performed by a processor of the user equipment. The obtaining unit 153, the synchronization unit 154, and the detection unit 155 have similar implementation as the location determining unit 152, and may be integrated together with the location determining unit 152, or may be separately implemented. The processor described herein may be a CPU, or an ASIC, or one or more integrated circuits configured to implement this embodiment of the present disclosure.

Figure 16:
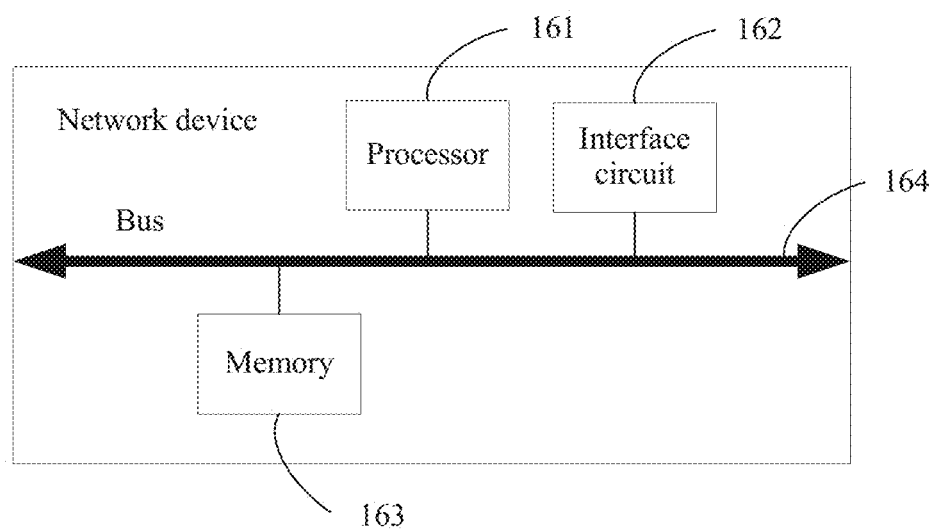
FIG. 16 is a schematic structural diagram of a network device according to another embodiment of the present disclosure.

Referring to FIG. 16, an embodiment of the present disclosure provides a network device that is configured to implement the foregoing synchronization method, including a processor 161, an interface circuit 162, a memory 163, and a bus 164. The processor 161, the interface circuit 162, and the memory 163 are connected and communicate with each other using the bus 164.

It should be noted that the processor 161 herein may be one processor, or may be a collective term of multiple processing elements. For example, the processor may be a CPU, or may be an ASIC, or may be one or more integrated circuits configured to implement this embodiment of the present disclosure, such as one or more microprocessors (such as digital signal processor (DSP)), or one or more field programmable gate arrays (FPGA).

The memory 163 may be one storage apparatus, or may be a collective term of multiple storage elements, and is configured to store executable program code or a parameter, data, and the like that are required for running an access network management device. The memory 163 may include a random access memory (RAM), or may include a non-volatile memory, such as a magnetic disk storage or a flash memory.

The bus 164 may be an industry standard architecture (ISA) bus, a peripheral component interconnect (PCI) bus, an extended ISA ( ) bus, or the like. The bus 164 may be categorized into an address bus, a data bus, a control bus, and the like. For ease of illustration, only one bold line is used in FIG. 16 to represent the bus 164, which, however, does not mean there is only one bus or only one type of bus.

For example, when the network device and user equipment communicate in a wireless manner, the interface circuit 162 may be configured as a transmitter having a signal transmitting function.

The processor 161 is configured to set a synchronization signal in a first subframe.

The interface circuit 162 is configured to send the first subframe or the first subframe and a second subframe to user equipment, where the first subframe includes M OFDM symbols, and the second subframe includes N OFDM symbols.

M and N are positive integers, M>N, and the first subframe and the second subframe are subframes of an unlicensed carrier.

According to the network device provided above, in a subframe of an unlicensed carrier, the network device sets a synchronization signal in a first subframe, and sends the first subframe carrying the synchronization signal to user equipment such that the user equipment obtains the synchronization signal from the received first subframe and performs synchronization, thereby implementing synchronization of data frame transmission between devices on the unlicensed carrier.

Optionally, the processor is configured to set the synchronization signal in a preset symbol of the first subframe.

Optionally, the first subframe includes four CRSs.

The processor 161 is further configured to set the synchronization signal in a third symbol of the first subframe.

Further optionally, the first subframe includes one CRS port or two CRS ports.

The processor 161 is further configured to set the synchronization signal in a second symbol of the first subframe.

Optionally, the first subframe includes no CRS.

The processor 161 is further configured to set the synchronization signal in a first symbol of the first subframe.

Optionally, the first subframe includes two timeslots.

The processor 161 is further configured to set the synchronization signal in the last symbol or the last but one symbol of a first timeslot in the first subframe.

Optionally, the synchronization signal includes at least one of the following, a PSS or an SSS.

Figure 17:
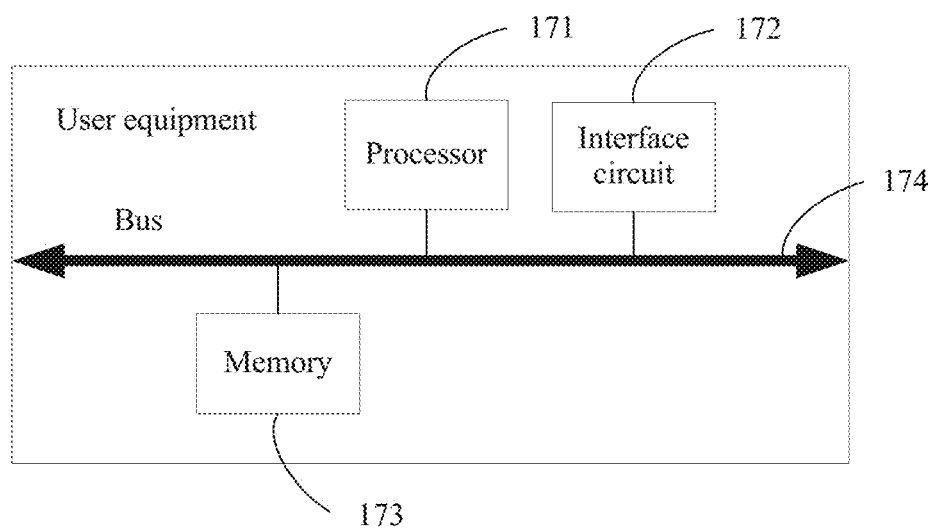
FIG. 17 is a schematic structural diagram of user equipment according to another embodiment of the present disclosure.

Referring to FIG. 17, an embodiment of the present disclosure provides user equipment that is configured to implement the foregoing synchronization method, including a processor 171, an interface circuit 172, a memory 173, and a bus 174. The processor 171, the interface circuit 172, and the memory 173 are connected and communicate with each other using the bus 174.

It should be noted that the processor 171 herein may be one processor, or may be a collective term of multiple processing elements. For example, the processor may be a CPU, or may be an ASIC, or may be one or more integrated circuits configured to implement this embodiment of the present disclosure, such as one or more microprocessors (such as DSP), or one or more FPGA.

The memory 173 may be one storage apparatus, or may be a collective term of multiple storage elements, and is configured to store executable program code or a parameter, data, and the like that are required for running an access network management device. The memory 173 may include a RAM, or may include a nonvolatile memory, such as a magnetic disk storage or a flash memory.

The bus 174 may be an ISA bus, a PCI bus, an EISA bus, or the like. The bus 174 may be categorized into an address bus, a data bus, a control bus, and the like. For ease of illustration, only one bold line is used in FIG. 17 to represent the bus 174, which, however, does not mean there is only one bus or only one type of bus.

For example, when a network device and the user equipment communicate in a wireless manner, the interface circuit 172 may be configured as a receiver having a signal receiving function.

The interface circuit 172 is configured to receive a first subframe or the first subframe and a second subframe sent by a network device, where the first subframe includes M OFDM symbols, the second subframe includes N OFDM symbols, M and N are positive integers, and M>N.

The processor 171 is configured to determine a location range of an OFDM symbol that is in the first subframe received by the interface circuit and that carries a synchronization signal, obtain the synchronization signal according to the location range of the OFDM symbol, and perform synchronization according to the synchronization signal, where the first subframe and the second subframe are subframes of an unlicensed carrier.

According to the user equipment provided above, in a subframe of an unlicensed carrier, a network device sets a synchronization signal in a first subframe, and sends the first subframe carrying the synchronization signal to the user equipment such that the user equipment obtains the synchronization signal from the received first subframe and performs synchronization, thereby implementing synchronization of data frame transmission between devices on the unlicensed carrier.

Optionally, the processor 171 is further configured to obtain a start location of a third subframe, and determine the location range of the OFDM symbol according to the start location of the third subframe, a CP of the OFDM symbol, and a quantity of CRSs of the first subframe, where the third subframe is a subframe of a licensed carrier.

The processor 171 is further configured to detect a CRS of the second subframe, and obtain a start location of the second subframe according to the CRS, where the start location of the second subframe is a location of the first OFDM symbol of the second subframe sent by the network device and received by the user equipment.

Optionally, the synchronization signal includes at least one of the following, a PSS or an SSS.

In addition, a computer readable medium is further provided, including a computer readable instruction that performs the following operations when the medium is executed the operations from 101 to 102, 201 to 203, 301 to 303, 401 to 403, 501 to 503, or 601 to 604 for executing the methods of the foregoing embodiments.

In addition, a computer program product is further provided, including the foregoing computer readable medium.

It should be noted that signaling mentioned in this specification includes but is not limited to an indication, information, a signal, a message, or the like, which is not limited herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present disclosure may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A synchronization method, implemented by a network device comprising a computer processor and an interface circuit, wherein the synchronization method comprises:
setting, by the computer processor of the network device, a synchronization signal in a first subframe of a data frame of an unlicensed carrier, wherein the synchronization signal comprises a coarse synchronization signal and a fine synchronization signal, wherein a location of the coarse synchronization signal is based on a quantity of cell-specific reference signal (CRS) ports used on the unlicensed carrier, wherein a location of the fine synchronization signal is based on a length of a cyclic prefix (CP) in data on the unlicensed carrier, wherein the first subframe of the data frame of the unlicensed carrier comprises a plurality of orthogonal frequency division multiplexing (OFDM) symbols, wherein the coarse synchronization signal is comprised in one of the OFDM symbols, and wherein the fine synchronization signal is comprised in two of the OFDM symbols; and
sending, by the interface circuit of the network device, the first subframe and a second subframe of the data frame to user equipment, wherein the first subframe comprises more OFDM symbols than the second subframe, and wherein the first subframe and the second subframe are subframes of the unlicensed carrier.

2. The synchronization method of claim 1, wherein the coarse synchronization signal is comprised in a second OFDM symbol of the first subframe of the data frame of the unlicensed carrier, and wherein the fine synchronization signal is comprised in a first OFDM symbol and a fourth OFDM symbol of the first subframe of the data frame of the unlicensed carrier.

3. The synchronization method of claim 1, wherein the coarse synchronization signal is comprised in a first OFDM symbol of the subframe of the data frame of the unlicensed carrier, and wheren the fine synchronization signal is comprised is a second OFDM symbol and a third OFDM symbol of the first subframe of the data frame of the unlicensed carrier.

4. The synchronization method of claim 1, wherein the first subframe comprises one CRS port, and wherein setting the synchronization signal in the first subframe comprises setting, by the computer processor of the network device, the synchronization signal in a second symbol of the first subframe.

5. The synchronization method of claim 1, wherein the first subframe comprises no CRS, and wherein setting the synchronization signal in the first subframe comprises setting, by the computer processor of the network device, the synchronization signal in a first symbol of the first subframe.

6. The synchronization method of claim 1, wherein the first subframe comprises two timeslots, and wherein setting the synchronization signal in the first subframe comprises setting, by the computer processor of the network device, the synchronization signal in a last symbol of a first timeslot in the first subframe.

7. The synchronization method of claim 1, wherein the synchronization signal comprises at least one of a primary synchronization signal (PSS) or a secondary synchronization signal (SSS).

8. A network device, comprising:
a bus;
a processor coupled to the bus and configured to set a synchronization signal in a first subframe of a data frame of an unlicensed carrier, wherein the synchronization signal comprises a coarse synchronization signal and a fine synchronization signal, wherein a location of the coarse synchronization signal is based on a quantity of cell-specific reference signal (CRS) ports used on the unlicensed carrier, wherein a location of the fine synchronization signal is based on a length of a cyclic prefix (CP) in data on the unlicensed carrier, wherein the first subframe of the data frame of the unlicensed carrier comprises a plurality of orthogonal frequency division multiplexing (OFDM) symbols, wherein the coarse synchronization signal is comprised in one of the OFDM symbols, and wherein the fine synchronization signal is comprised in two of the OFDM symbols; and
an interface circuit coupled to the bus, wherein the interface circuit is configured to send the first subframe and a second subframe of the data frame to user equipment, wherein the first subframe comprises more OFDM symbols than the second subframe, and wherein the first subframe and the second subframe are subframes of the unlicensed carrier.

9. The network device of claim 8, wherein the coarse synchronization signal is comprised in a second OFDM symbol of the first subframe of the data frame of the unlicensed carrier, and wherein the fine synchronization signal is comprised in a first OFDM symbol and a fourth OFDM symbol of the first subframe of the data frame of the unlicensed carrier.

10. The network device of claim 9, wherein the coarse synchronization signal is comprised in the first OFDM symbol of the first subframe of the data frame of the unlicensed carrier, and wherein the fine synchronization signal is comprised in a third OFDM symbol of the first subframe of the data frame of the unlicensed carrier.

11. The network device of claim 8, wherein the first subframe comprises one CRS port, and wherein the processor is further configured to set the synchronization signal in a second symbol of the first subframe.

12. The network device of claim 8, wherein the first subframe comprises no CRS, and wherein the processor is further configured to set the synchronization signal in a first symbol of the first subframe.

13. The network device of claim 8, wherein the first subframe comprises two timeslots, and wherein the processor is further configured to set the synchronization signal in a last symbol of a first timeslot in the first subframe.

14. User equipment, comprising:
a bus;
an interface circuit coupled to the bus and configured to receive a first subframe of a data frame and a second subframe of the data frame from a network device, wherein the first subframe comprises more orthogonal frequency division multiplexing (OFDM) symbols than the second subframe, and wherein the first subframe and the second subframe are subframes of an unlicensed carrier; and
a processor coupled to the interface circuit through the bus and configured to:
determine a location range of an OFDM symbol that is included in the first subframe and that carries a synchronization signal, wherein the synchronization signal comprises a coarse synchronization signal and a fine synchronization signal, wherein a location of the coarse synchronization signal is based on a quantity of cell-specific reference signal (CRS) ports used on the unlicensed carrier, wherein a location of the fine synchronization signal is based on a length of a cyclic prefix (CP) in data on the unlicensed carrier, wherein the first subframe of the data frame of the unlicensed carrier comprises a plurality of OFDM symbols, wherein the coarse synchronization signal is comprised in one of the OFDM symbols, and wherein the fine synchronization signal is comprised in two of the OFDM symbols;
obtain the synchronization signal according to the location range of the OFDM symbol; and
perform synchronization according to the synchronization signal.

15. The user equipment of claim 14, wherein the coarse synchronization signal is comprised in a second OFDM symbol of the first subframe of the data frame of the unlicensed carrier, and wherein the fine synchronization signal is comprised in a first OFDM symbol and a fourth OFDM symbol of the first subframe of the data frame of the unlicensed carrier.

16. The user equipment of claim 14, wherein the coarse synchronization signal is comprised in a first OFDM symbol of the first subframe of the data frame of the unlicensed carrier, and wherein the fine synchronization signal is comprised is a second OFDM symbol and a third OFDM symbol of the first subframe of the data frame of the unlicensed carrier.

17. The synchronization method of claim 1, wherein the first subframe comprises two CRS ports, and wherein setting the synchronization signal in the first subframe comprises setting, by the computer processor of the network device, the synchronization signal in a second symbol of the first subframe.

18. The synchronization method of claim 1, wherein the first subframe comprises two timeslots, and wherein setting the synchronization signal in the first subframe comprises setting, by the computer processor of the network device, the synchronization signal in a next to last symbol of a first timeslot in the first subframe.

19. The network device of claim 8, wherein the first subframe comprises two CRS ports, and wherein the processor is further configured to set the synchronization signal in a second symbol of the first subframe.

20. The network device of claim 8, wherein the first subframe comprises two timeslots, and wherein the processor is further configured to set the synchronization signal in a next to last symbol of a first timeslot in the first subframe.

* * * * *